INVENTORS
RENE HIGONNET
LOUIS MOYROUD
ATTORNEYS

Sept. 6, 1960  R. HIGONNET ET AL  2,951,428
TYPE COMPOSING APPARATUS
Original Filed Sept. 20, 1950  6 Sheets-Sheet 3

Sept. 6, 1960 R. HIGONNET ET AL 2,951,428
TYPE COMPOSING APPARATUS
Original Filed Sept. 20, 1950 6 Sheets-Sheet 4

R. HIGONNET ET AL 2,951,428

TYPE COMPOSING APPARATUS

Original Filed Sept. 20, 1950

Inventors
René Higonnet &
Louis Moyroud
By Kenway, Jenney
Witter & Hildreth
Attys.

Sept. 6, 1960    R. HIGONNET ET AL    2,951,428
TYPE COMPOSING APPARATUS
Original Filed Sept. 20, 1950    6 Sheets-Sheet 6

FIG. 9

INVENTORS
RENE HIGONNET
LOUIS MOYROUD
BY
ATTORNEYS

United States Patent Office 2,951,428
Patented Sept. 6, 1960

2,951,428

TYPE COMPOSING APPARATUS

Rene Higonnet, Cambridge, and Louis Moyroud, West Medford, Mass., assignors to Graphic Arts Research Foundation, Inc., Cambridge, Mass., a corporation of Delaware Continuation of application Ser. No. 526,493, Aug. 4, 1955, which is a division of application Ser. No. 186,652, Sept. 20, 1950, now Pat. No. 2,715,862, dated Aug. 23, 1955. This application Aug. 22, 1957, Ser. No. 680,034

Claims priority, application Great Britain Sept. 23, 1949

18 Claims. (Cl. 95—4.5)

This invention relates to photographic type composing apparatus, and more particularly to structure including an alphabet matrix formed upon an element in the projection apparatus. Detailed descriptions of certain forms of type composing apparatus utilizing character matrices of a generally similar character are given in our Patent Nos. 2,790,362 and 2,652,755.

This application is a continuation of our copending application Serial No. 526,493, filed August 4, 1955, now abandoned, said application being a division of our application, Serial No. 186,652, filed September 20, 1950, now Patent No. 2,715,862.

A principal element in any photographic composing apparatus within the purview of this invention is a character carrier (for example, a disk or drum) upon which is formed the above-mentioned matrix, and which cooperates with a rotating mechanism causing the characters disposed on the carrier to move relative to a projection position. Selected characters are projected while in relative motion by an intermittent flash device which is preferably energized on the discharge of a condenser.

In order to cause the flash device to be energized at the precise instant that a selected character is accurately aligned in the projection position, one form of the energizing circuit for the flash device, as disclosed in our said application Serial No. 770,320, now Patent No. 2,790,362, includes a coarse control and a fine control, whereby a flash occurs only on the simultaneous operation of both controls. In this form of the energizing circuit the coarse control is operative during the period that the selected character passes in projection position; the fine control is operative at the precise instant that each and every character passes in projection position and is not adapted to discriminate between the characters.

An alternative form of energizing circuit for the flash device includes controls by means of which the coarse control is combined with the fine control as explained in said Patent No. 2,652,755. In this form the controls are apertures or slits coded with transparent or opaque segments, the controls being carried on the character carrier in precise spatial relation to the characters.

Thus, the present invention involves character matrices in which the characters are located in fixed spatial relation to precise controls which function to trigger the flash tube.

A principal object of this invention is to provide a plurality of selectable fonts or alphabets on a single character carrier, and means for selection of the characters according to the style of the type face desired.

Another object is to provide a compact, rotatable character carrier bearing on its surface a large number of characters comprising a plurality of selectable fonts in different type faces or styles.

Another object is to provide means for bringing a selected character in a selected font into photographic position and means for projecting the character onto a sensitized sheet or film when it is accurately aligned in said position.

A still further object is to provide means for accurately projecting a selected character, said means including a control integral with the character carrier.

With the foregoing and other objects in view, as will be further appreciated from the description to follow, the features of the invention include a disk having thereon a number of concentric circles of characters.

According to another feature, the disk is rotated continuously about its axis to bring characters in a single circle successively into photographic position, and the axis is moved to select the circle containing characters of the desired font. Discrimination between the characters in a given circle is provided by decoding mechanism which is operative during a selected fraction of a revolution of the disk.

According to another feature photoelectric means including a single photocell and a plurality of apertures on the character-bearing disk are provided to project any selected character at a moment when it is located precisely in the projection position.

Figure 1:
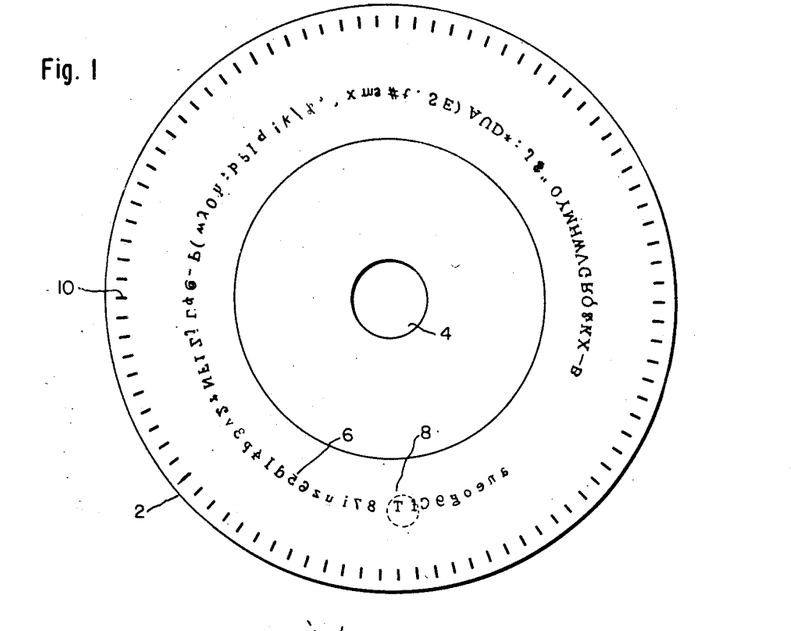
Fig. 1 shows a two-alphabet matrix formed upon a disk.

A detailed explanation of the operation of apparatus using the simplified disk of Fig. 1 as a matrix support may be found in our copending application Serial No. 770,320, above mentioned. Briefly, a disk 2 having an opaque surface indicated as white rotates at continuous speed about a fixed axis 4, thereby causing transparent characters indicated by black lines such as 6 to pass successively through a projection position represented by dotted lines at 8. At some fixed angle from each character 6 is a corresponding transparent slit 10. This angle may be of any desired size, but every character must bear precisely this same angular relationship to its own slit. It will readily be seen that the number of alphabets or fonts in the circle of characters may be increased or decreased to suit the needs of the composer, the only limitations being dependent upon the sizes of the characters and the diameter of the character circle.

Figure 2:
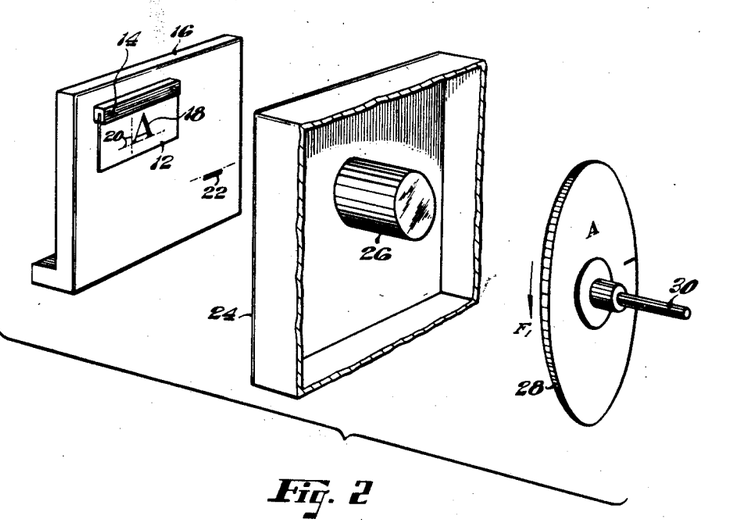
Fig. 2 is a schematic view of a jig for preparation of a matrix upon a disk.

Fig. 2 shows a jig according to the invention which is adapted to form a matrix upon the disk of Fig. 1 by photographic projection of characters and slits. A number of character forms 12 are provided, one for each character to be projected upon the matrix. The forms are provided with holes adapted to register with pegs 14 on a fixed frame 16. The characters 18 are placed upon the forms in such a manner that a reference point in the character, for instance the lower left-hand corner at the intersection of a pair of axes 20, is in a predetermined fixed relationship with the registration pegs 14. The location of this reference point is a function of certain factors which may be summarized as follows: Assuming that the composing machine is adapted to print the characters in the same order that they are stored, if the character is erect on the form, as shown, and is projected by the composing machine before the machine spaces the width of the character, the reference point is at the intersection of the axes 20 as shown in Fig. 2. If the character is inverted and reversed on the form and the projection precedes the spacing the reference point is at the upper right-hand corner of the character. If the character is erect but the width spacing precedes the projection the reference point is at the lower right-hand corner of the character. If the character is inverted and reversed on the form and the projection follows the width spacing the reference point is at the upper left-hand corner of the character. For a machine adapted to print in reverse of the order of storage the above summary is correct if the words "left" and "right" are substituted for each other.

A slit or aperture form 22, which is also referred to as a "registration device," is also placed upon the frame 16. This form is a black rectangle which photographs on the matrix as a "slit" 10. The form 22 remains fixed upon the frame for all of the characters 12. One edge of the aperture form, for instance the upper edge as shown in the figure, is also placed in a predetermined fixed relationship with the registration pins 14. The particular edge of the aperture form selected for this is a function of the direction of rotation of the disk 2 during normal composing machine operation. On the assumption that the disk is to rotate in the direction of the arrow at $F_1$ the correct edge for the apparatus of Fig. 2 is the upper edge as shown.

An appropriate light-tight enclosure 24 contains a projection lens and shutter assembly 26 the axis of which passes through the point of intersection of the axes 20. Within the enclosure is mounted a disk or matrix support 28, keyed to a shaft 30 which is rotatable about a fixed axis. The disk is preferably constructed of a rigid materal, such as glass upon which a photosensitive film has been prepared.

With the disk 28 held in a fixed position the first character may be projected by operation of the shutter in the assembly 26. Appropriate means such as a ratchet and pawl may be employed to rotate the disk through an angle sufficient to allow necessary clearance between successive projections. The character form 12 is replaced by other forms and the process is repeated until all characters in the matrix have been projected. As shown by our above-cited application, Serial No. 770,320, the negative images on the disk 28 are usable in a photographic composing machine after development without the necessity for making a positive print.

It is to be noted that an exceptional degree of precision is inherent in the preparation of the matrices, since each character and its corresponding slit are photographed in a precise angular relationship. The spacing between successive characters is not required to be precise, and the precision of the matrix is therefore independent of the angle through which the disk is turned in the jig between successive character projections.

It will be apparent that the jig shown in Fig. 2 may also be readily adapted for the preparation of disk-matrices such as those described in said Patent No. 2,652,755. For this purpose the simple aperture form 22 is replaced with other forms having black and white segments according to the coding of the character with which it is photographed. The precision of the relationship between each character and its fine control is maintained, because of the accurate mounting of the forms.

To adapt the jig for production of matrices having other combinations of opaqueness or transparency of slits and characters, the slit or character forms may be themselves transparent with a source of light behind, or they may be white on a black background.

Figure 3:
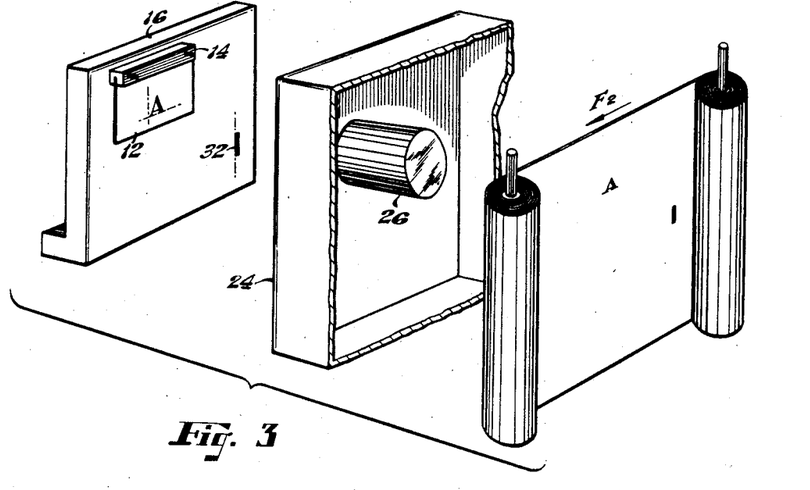
Fig. 3 is a schematic view of a jig for preparation of a matrix upon a drum.

Fig. 3 shows a jig according to the invention which is adapted to form a matrix upon a drum by photographic projection of characters and slits. A detailed explanation of the operation of apparatus using a drum of this type may be found in our copending application, Serial No. 770,320. Usually, as is there shown, the matrix, when bent over the drum, takes the form of a number of circles of characters, each devoted to a particular font. It is usual to provide a number of circles of slits corresponding to the character circles. The matrix is produced on a film strip or matrix support wrapped over the drum in such a manner as to permit all of the characters of a particular selected circle to move through the projection position in one revolution of the drum, the selection of font being performed by sliding the drum along its axis.

The jig for preparation of the drum matrix is essentially similar to that of Fig. 2, but with a few changes. The aperture form 32 corresponding to the form 22 of Fig. 2 is preferably located with its precision edge aligned vertically instead of horizontally. Assuming that the matrix when wrapped over the drum is to rotate in the direction of the arrow at $F_2$ the precision edge is at the left of the aperture form instead of at the top as in Fig. 2. A matric formed in the above manner is adapted for motion of the characters in a horizontal rather than a vertical direction through the projection position. It is generally agreed that slight vertical errors in character registration are more likely to be noticed than horizontal errors. Since the direction of rotation corresponds to the dimension in which errors in registration are more likely to occur if at all, the above procedure is preferable. It will be noted that similar provision in the apparatus of Fig. 2 causes any registration errors to appear in the horizontal dimension.

It will again be noted that, as with the jig of Fig. 2, the production of a matrix by the method of Fig. 3 does not depend for its accuracy upon the exactness of the distance through which the matrix is moved between successive character projections.

While only one lens-shutter combination is shown in Figs. 2 and 3, it is equally possible to provide two lenses, one for projection of characters and one for projection of slits or apertures, the only requirement being that both projections must occur without intermediate movement of the forms or matrix support.

Figure 3A:
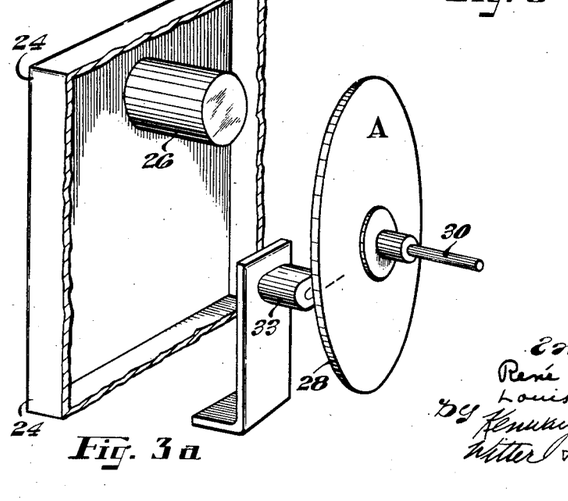
Fig. 3a shows a registration device for use in the jig of Fig. 2 in place of the aperture form.

The fine controls may be produced by other than photographic means. Where this is done the registration device, which in Figs. 2 and 3 is the aperture form 22 is replaced by a registration device as shown in Fig. 3a, which is also fixed in relation to the character forms, but so located with respect to the matrix support as to permit the creation on the matrix of some discrete, measurable property corresponding in function to the slits shown in the drawings. For example, in Fig. 3a an electromagnet 33 is shown on a fixed support in position to magnetize areas of a magnetic surface on the disk.

Figure 4:
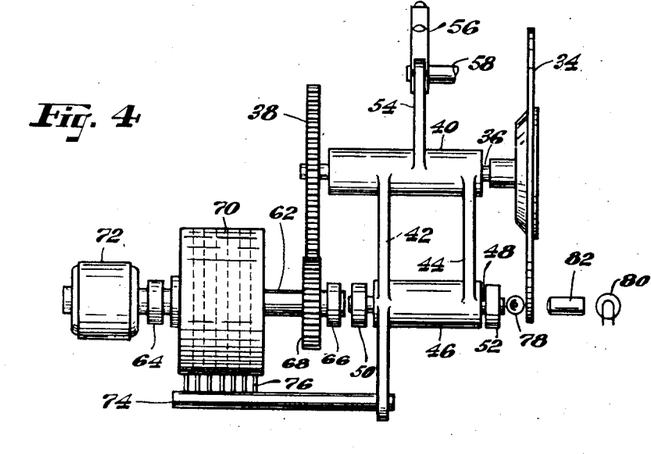
Fig. 4 is a side view of an alternative form of matrix disk and driving assembly.
Figure 5:
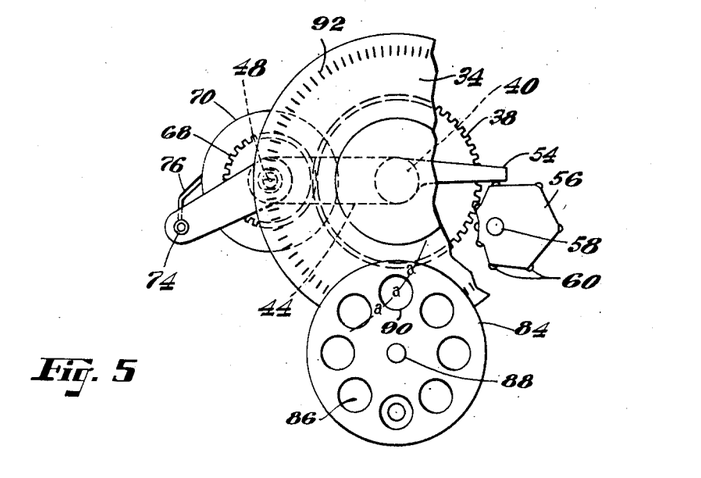
Fig. 5 is a front view of the assembly shown in Fig. 4.

Figs. 4 and 5 show an alternative form of projection apparatus using a disk as the character carrier. This apparatus according to the present invention, is designed to permit the use of the disk area for a number of different concentric fonts, which is not possible by the use of disks such as those described in the above-mentioned applications. Referring to Fig. 4, a disk 34 is keyed to a shaft 36 to which is also keyed a gear 38. The shaft 36 is rotatably mounted in a sleeve 40 supported by two arms 42 and 44 and a second sleeve 46 rotatably mounted on a fixed shaft 48. The shaft 48 is supported by two fixed bearings 50 and 52. The above assembly may be rotated about the axis of the shaft 48 by an arm 54 integral with the sleeve 40, the arm cooperating with a cam 56 rotatable to a number of fixed positions about a fixed shaft 58. The exact positions to which the arm is moved are determined by a number of screws 60 set in the faces of the cam (see Fig. 5). To permit the cam to move the arm 54 with great precision the screws 60 are provided with heads which are spherical sectors, the radius of the sphere for each screw being equal to the distance of the particular screw from the axis of rotation of the cam. Thus, slight inaccuracies in cam position do not produce corresponding inaccuracies in the position of the arm.

Coaxial with the shaft 48 is a shaft 62 supported by a pair of fixed bearings 64 and 66. The shaft 62 is keyed to a gear 68, a decoding drum 70 and a motor 72. By a projection on the sleeve 46 an arm 74 supports a number of brushes 76 in contact with the drum 70. The drum 70 is a coarse control comprised of coded areas of insulating and conducting material similar to that described in above-cited application Serial No. 770,320, and there shown in Fig. 32, but it will be readily apparent that any equivalent device, such as a rotating switch cooperating with a set of register operated or keyboard operated relays, may be employed for the coarse control, as shown by our copending application, Serial No. 610,336, filed August 11, 1945.

A photoelectric cell 78 is supported in a fixed position substantially within the axis of the shafts 48 and 62 and receives light through slits in the disk, the source of light comprising a continuous light source 80 and a collecting lens 82.

Referring to Fig. 5, a lens turret 84 supports a number of lens systems 86 and is adapted to rotate about a fixed axis 88 to provide means for changing the size of character projections, or "point size." As in the simpler form of disk already described, each character of a selected font is in projection position when its reference point, defined as above for Fig. 2, coincides with the optical axis of the selected lens. In Fig. 5, for example, the selected lens is shown at 90 and a character "a" is in the projection position.

The characters are arranged on the disk 34 (Figs. 4 and 5) in concentric circles, with a different font in each circle. The font of the projected characters is changed by rotation of the cam 56 to bring a different font of characters within the optical axis of the selected lens at the position 90.

Outside the circles of characters is a circle of slits 92, there being as many slits as there are characters in any one circle. When any character passes through the projection position its corresponding slit is so located as to pass through the axis of the shafts 48 and 62 and to actuate the photoelectric cell 78 at the same moment. At this moment the decoding drum 70 is arranged to be so located with respect to the brushes 76 that the brushes are resting on the sector of the drum corresponding to the character then in the projection position.

It will be noted that the ratio of the gears 68 and 38 is one to two. This is to permit the drum 70 to rotate at twice the speed of the disk 34, since it is convenient to place the lower case of each font in one half of the disk, and the upper case in the other half, with 180 degrees between the upper and lower cases of each character. It will become readily apparent from the description to follow, that other gear ratios and character arrangements may also be used, as desired.

The operation of the above-mentioned apparatus of Figs. 4 and 5 may be described by first assuming that the motor 72 drives the disk 34 at continuous speed and that the selected font is the center font as shown in Fig. 5. It is now desired to project, for example, the lowest font. All projections are therefore discontinued and the cam 56 is rotated to a position which raises the lowest font into position for projection; whereupon projections in the new font are immediately recommenced. The motor 72 rotates continuously and this rotation is not affected by the change of font. Since the circle of slits passes through the center of rotation of the mechanism, the changing of font does not move the slits out of line with the photoelectric cell.

It will be obvious to those familiar with the art that, in order not to upset the relationship between the brushes 76, the drum 70 and the disk 34 when the font is changed, it is necessary to cause the brushes 76 to lead their former positions in a counterclockwise direction by the same angle through which the sleeve 40 to rotated.

Figure 9:
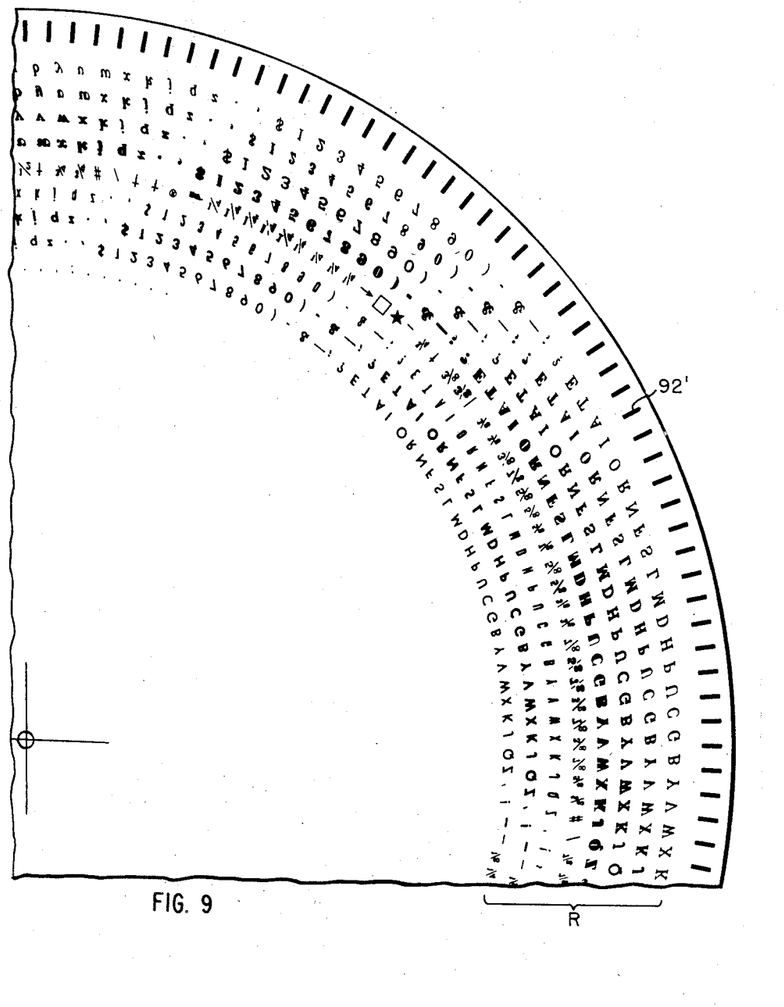
Fig. 9 is a fragmentary view of a character disk having a plurality of concentric character rings.

It will further be evident that a disk constructed according to the requirements of Figs. 4 and 5 or Fig. 9 must carry a matrix on which, given the distance between the axis of the shaft 48 and the optical axis of the selected projection lens, the center of each slit is the center of a circular arc of radius equal to this distance containing all characters associated with the same slit. Thus, all the "a's" are on one circular arc corresponding to a single slit, and all the "b's" are on another circular arc corresponding to a different slit.

A feature of the apparatus of Figs. 4 and 5 is that, while the amount of rotation of the sleeve 40 to change the font depends on the differences in the radii of the respective circles of characters, these differences may be made any convenient value without reference to any of the above-mentioned physical relationships. (As hereinafter noted, there are other forms of apparatus within the scope of the invention wherein the differences in radii of the character circles are necessarily related to the angles subtended between adjacent slits.)

Figure 6:
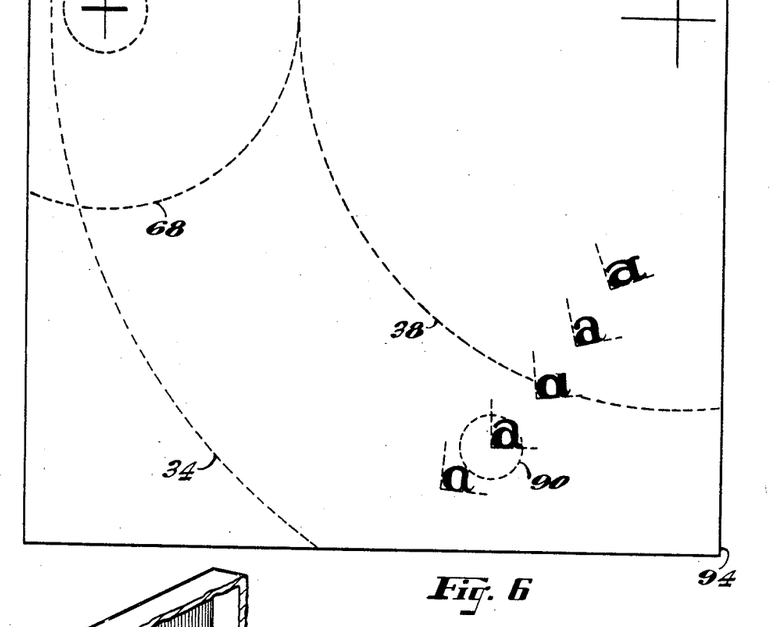
Fig. 6 is a schematic view of a frame for preparation of the matrix used in the assemblies of Figs. 4 and 5.

Fig. 6 schematically shows a frame 94 for preparation of a matrix for use in the apparatus of Figs. 4 and 5. This frame corresponds to the frame 16 in Fig. 2 and is used in the same jig as shown in Fig. 2. In Fig. 6 the dotted lines show locations of the disk in the jig to receive the character projections and of the gears 38 and 68 relative to the disk when the disk is mounted in the composing machine.

It will be noted that the frame of Fig. 6, when used in place of the frame 16 in Fig. 2, provides a jig which produces a precise character-slit relationship irrespective of the angular displacements between successive slits or between successive arcs of characters belonging to the same slit. Thus, as with all of the jigs heretofore described, it is immaterial as far as accuracy of character registration is concerned whether the disk is accurately rotated in the jig between successive multiple-character projections.

Figure 7:
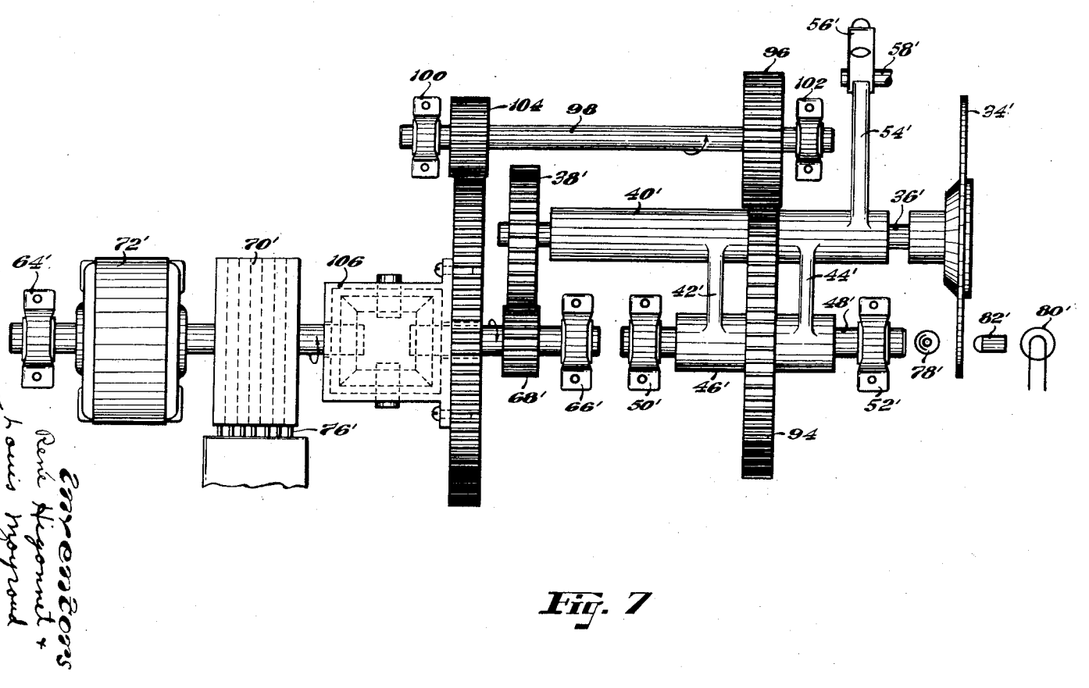
Fig. 7 is an alternative form of driving assembly for a disk.

A modified form of the apparatus of Figs. 4 and 5 is shown in Fig. 7. This mechanism is substantially similar to that of Fig. 4, and this is indicated in Fig. 7 by giving to those elements which are similar to elements of Fig. 4 the same numbers which they have in that figure, with a prime.

To the mechanism of Fig. 4 is added a differential gear mechanism comprising a gear 94, rigidly supported by the sleeves 40' and 46' coaxially with the shaft 48' a gear 96 keyed to a shaft 98 rotatable about a fixed axis on a pair of bearings 100 and 102, a gear 104, and a planetary differential gear assembly 106. This assembly is of conventional construction and does not need to be particularly described to those familiar with conventional gearing systems.

By means of this differential gear mechanism a component of the motion of the disk 34' during the period that the mechanism is changing fonts is suppressed. This motion, unsuppressed by the apparatus of Fig. 4, is due to a component of the rolling motion of the gear 38 on the gear 68 which is produced when the font is changed. In order to demonstrate the significance of this rolling action, it may first be assumed, for example, that the disk of Fig. 5 normally rotates in a clockwise direction. Suppose that the lowest or outside font is being projected and that it is desired to project the uppermost or inside font. This requires the lowering of disk 34. Because of the consequent rolling action of the gears 38 and 68 a sudden acceleration of the disk is thereby created, the direction of which is the same as that in which the disk is rotating. This acceleration will cause several slits to pass through the position to actuate the photoelectric cell before the disk comes to rest and resumes its former continuous rate of rotation. In other words, if a change of font starts when an "a" is in projection position, even through the change of font may be accomplished faster than the time lapse between the passage of the "a" and the "b," the rolling action referred to above prevents the projection of a "b" or a "c" immediately after the change of font, those characters having passed beyond the projection position by the time the change of font has been accomplished. This phenomenon is referred to as the "skipping" of characters. Likewise, the brushes 76 on the decoding drum 70 sweep over a number of coded sectors during the change of font corresponding to the number of "skipped" slits and characters on the disk.

It will be noted that the above consequences follow from an assumption as to the direction as well as the amplitude of the rotation involved in the change of font. It is apparent that a change in the opposite direction, as for example, from the inner to the outer font, does not result in "skipped" characters. It is also apparent that, if there is "skipping," the number of "skipped" characters will depend upon the distance between the two fonts involved.

As will be evident from Fig. 7, a differential gearing may be used to suppress the component of rolling action between the gears 38' and 68' due to the changing of fonts. When this is done the disk 34' does not accelerate as above and no characters are skipped during the change of font. If the time required for this purpose exceeds the time lapse between the passage of successive characters through the projection position, a number of characters will be skipped, but the number is always a constant, regardless of which direction of motion of the disk the change of font requires and also regardless of which two fonts are involved. This results in a saving of time when a font change is required, since characters which would otherwise be "skipped" can be projected immediately after the change of font, rather than nearly a complete revolution of the disk after the change is completed. Note that the brushes 76' are held stationary in Fig. 7.

From the foregoing, it is clear that a matrix prepared according to the above description of Fig. 6 may be used in the mechanism of Fig. 7, since the addition of the differential gearing has no effect upon the distance between a slit and the group of characters with which the slit is associated.

Turning to Figs. 4 and 5, a further consideration of the relationship between the disk and its driving gears reveals that various types of matrices may be carried upon the disk if certain additional conditions and changes are imposed upon the various members. For example, and in order to simplify matters, let it be assumed that the gear 68 in Fig. 5 remains fixed instead of rotating at a fixed speed. If the font is changed to the next outer ring of characters from any initial font the gear 38 will roll counterclockwise around the gear 68. A slit, assumed to be in the position 48 initially, will move out of this position due to the rolling motion. Suppose that a condition is imposed upon the cam 56 and the matrix such that the new font is exactly reached at precisely the same point at which the next succeeding slit reaches the position 48. The matrix is also arranged so that, when the mechanism reaches the new font position, any character, which was initially in projection position, such as the "a" in Fig. 5, again reaches that position in the new font. A number of interesting consequences follow. For example, the mechanism under these conditions will now perform in a manner similar to that of Fig. 7, that is to say, there will be either no "skipping" of characters during the change of font or the number "skipped" will be a constant, and this is true even though there is no differential gearing to suppress the acceleration of the disk during the change of fonts. It will be evident that the brushes 76 must be held stationary as in Fig. 7, however.

Figure 8:
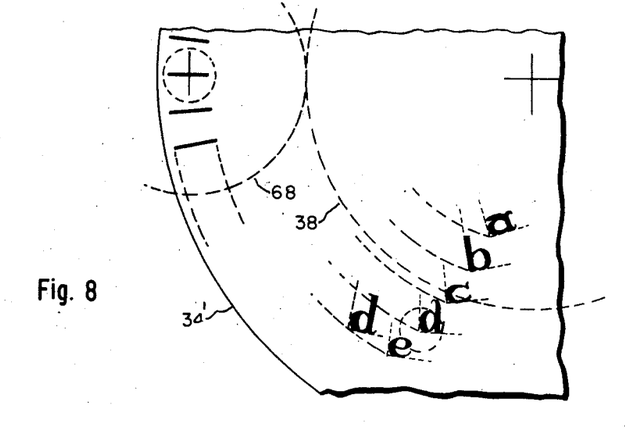
Fig. 8 is a view similar to Fig. 6 and illustrating an alternative arrangement of the characters.

Applying conventional mechanism theory to determine the locations of the characters on a matrix conforming to the above conditions, it will be seen that a curve joining the reference points of like characters, such as all the "a's" or all the "b's," is not a circle as in the multifont matrix disk referred to above. Instead, the curve is on the locus of points on the disk which pass through the projection position during the change of font as above described, assuming that the gear 68 is held stationary. This does not mean, however, that the frame shown in Fig. 6, wherein the characters are arranged in the arc of a circle about the corresponding slit may not be used to prepare the matrix, since, instead of projecting all "a's" or "b's" simultaneously, the characters will be photographed in groups, such as "a, b, c, d," or "k, l, m, n," each group being formed in the arc of a circle on the matrix, as illustrated in Fig. 8 showing a fragment of a disk 34' according to this variant.

It will be appreciated that the foregoing description of specific embodiments of the invention will suggest numerous variations and adaptations thereof to those familiar with the art, which may be effected to suit the needs of a particular composing apparatus without departing from the spirit or scope of the invention.

Having thus described our invention, we claim:

1. In apparatus for photographic type projection, a disk having a plurality of concentric character rings, each ring representing a different font and having the same number of characters as every other ring, and a ring of apertures concentric with the character rings, there being an aperture for each of the characters in any character ring, said aperture being at the center of a circular arc passing through a character in each ring.

2. A disk according to claim 1 having like characters in the several fonts on the same circular arc corresponding to each particular aperture.

3. A disk according to claim 1 having consecutive characters in the several fonts on the same circular arc corresponding to each particular aperture.

4. In apparatus for photographic type projection, the combination of a disk having a plurality of concentric character rings representing different fonts and a concentric ring of apertures, a driving shaft keyed to the disk, and font-changing means for rotating the disk and shaft about a fixed axis parallel to the shaft and at substantially the same radius from the shaft as the ring of apertures.

5. In apparatus for photographic type projection, the combination of a disk having a plurality of concentric character rings representing different fonts and a concentric ring of apertures, a driving shaft keyed to the disk, font-changing means for rotating the disk and shaft about a fixed axis parallel to the shaft and at substantially the same radius from the shaft as the ring of apertures, and driving means for the disk comprising a first gear keyed to the shaft, a second gear in mesh with the first gear and coaxial with the said axis, and means for driving the second gear.

6. In apparatus for photographic type projection, the combination of a disk having a plurality of concentric character rings representing different fonts and a concentric ring of apertures, a driving shaft keyed to the disk, font-changing means for rotating the disk and shaft about a fixed axis parallel to the shaft and at substantially the same radius from the shaft as the ring of apertures, driving means for the disk comprising a first gear keyed to the shaft, a second gear in mesh with the first gear and coaxial with the said axis, and means for driving the second gear, and decoding means for selecting characters to be projected comprising a contact element keyed with the second gear in position corresponding to the positions of the characters on the disk, and a brush element having provision to rotate with respect to the contact element by the same angle through which the disk and shaft rotate with respect to the said axis.

7. In apparatus for photographic type projection, the combination of a first shaft rotatable about a fixed axis, means for driving the first shaft continuously, a second shaft, a support for the second shaft having provision for rotating the second shaft in a circular arc about the fixed axis to change the font, a disk keyed to the second shaft having a plurality of concentric character rings representing different fonts and a concentric ring of apertures at substantially the same radius from the second shaft as the distance between the second shaft and the fixed axis, driving means for the disk comprising a gear train keyed to the two shafts, fixed projection means including an intermittent flash device for projecting selected characters of different fonts upon a sensitized sheet, and means for energizing the intermittent flash device comprising a coarse control having a contact element keyed to the first shaft in position corresponding to the positions of the characters on the disk and a brush element fixed to the support for the second shaft, and a fine control comprising photoelectric means in position to be actuated by each aperture as it passes through the fixed axis, the flash device being energized only on the simultaneous operation of both controls.

8. Apparatus according to claim 7, in which the gear train driving the disk comprises a differential gear assembly having a first input connected to the first shaft, a second input connected by a spur gear train to rotate by angles proportional to the rotation of the support for the second shaft, and an output shaft, and spur gears connecting the output shaft and the second shaft, except that the brush element in the coarse control is disconnected from the support for the second shaft and held fixed.

9. In apparatus for photographic type projection, a character carrier having at least three concentric character rings of different radii representing different alphabets of characters for projection, the characters being arranged in a plurality of circular arcs, each arc including characters in at least three of said rings.

10. In apparatus for photographic type projection, a character carrier having at least three concentric character rings of different radii representing different alphabets of characters for projection, the characters being arranged in a plurality of congruent arcs, each arc including a character in each of at least three of said rings.

11. In apparatus for photographic type projection, a character carrier having at least three concentric character rings of different radii representing different alphabets of characters for projection, the characters being arranged in a plurality of circular arcs, each arc including a character in each of at least three rings and having its center in a circle common to the centers of the other arcs.

12. In apparatus for photographic type projection, the combination of a character carrier having a plurality of concentric character rings of different radii representing different alphabets of characters for projection, means to rotate the carrier about an axis fixed therein, and alphabet-changing means to rotate said axis about a fixed second axis parallel thereto.

13. In apparatus for photographic type projection, the combination of a character carrier having a plurality of concentric circular rings of characters of different radii representing different alphabets of characters for projection, means to rotate the carrier about an axis passing through the center of said ring, and alphabet-changing means to rotate said axis about a fixed second axis parallel thereto.

14. In apparatus for photographic type projection, the combination of a disk having a plurality of concentric character rings representing different alphabets of characters for projection, a driving shaft secured to the disk, and alphabet-changing means for rotating the disk and the axis of the shaft about a fixed axis parallel to and spaced from the shaft.

15. In apparatus for photographic type projection, the combination of a character disk, means for rotating the disk about a first axis fixed in relation to the disk, said disk bearing a number of circles of characters centered in said axis, and selecting means for rotating said disk and the axis of the shaft about a second axis parallel to and spaced from the first axis.

16. In apparatus for photographic type projection, the combination of a character disk, means for rotating the disk about a first axis fixed in relation to the disk, said disk bearing a number of circles of characters centered in said axis, a support for the disk to cause a circle of characters to intersect a projection position, whereby the characters of said circle pass consecutively through said position when the disk is rotated about said first axis, and means to select another circle of characters including means to pivot said support about a second axis displaced from said first axis.

17. In apparatus for photographic type projection, the combination of a character carrier having a plurality of concentric character rings of different radii representing different alphabets of characters for projection, means to rotate the carrier about the axis of said rings, projection apparatus in position to cause the characters in a selected ring to pass consecutively through a projection position, and alphabet-changing means to rotate said axis about a fixed second axis parallel thereto to present a different ring in said position.

18. In apparatus for photographic type projection, the combination of a character disk having a plurality of concentric character rings of different radii representing different alphabets of characters for projection, means to rotate the disk about the axis of said rings, projection apparatus in position to cause the characters in a selected ring to pass consecutively through a projection position, and alphabet-changing means to rotate said axis about a fixed second axis parallel thereto to present a different ring in said position.

References Cited in the file of this patent
UNITED STATES PATENTS

| | | |
|---|---|---|
| 943,614 | Blacklidge | Dec. 14, 1909 |
| 1,166,504 | Webster | Jan. 4, 1916 |
| 1,283,394 | Bawtree | Oct. 29, 1918 |